Dec. 30, 1930.                F. E. COMER                1,786,825
                              PIPE COUPLING
                           Filed Feb. 10, 1927
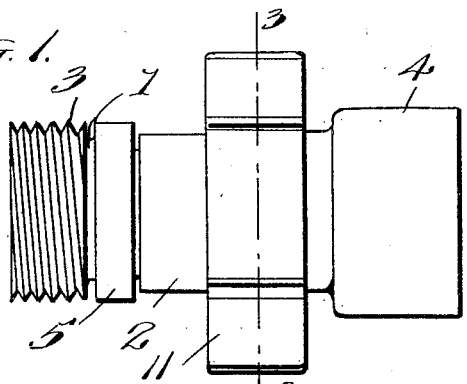
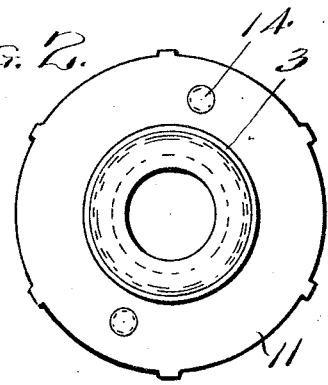
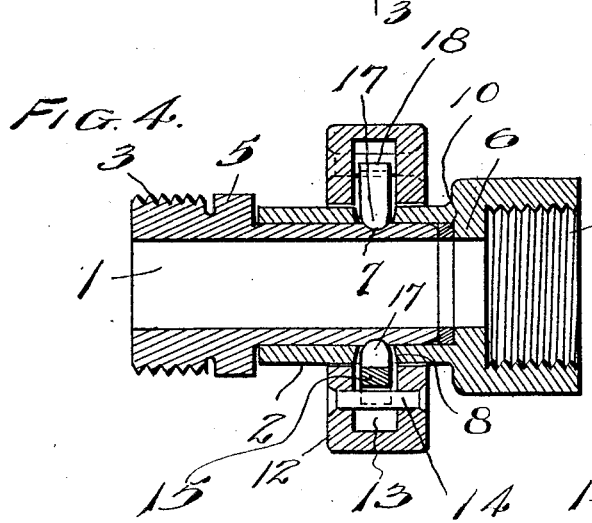
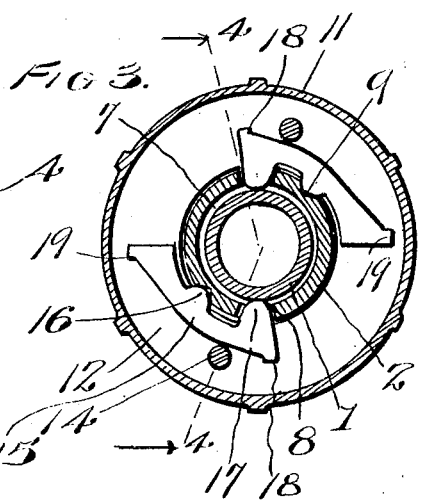
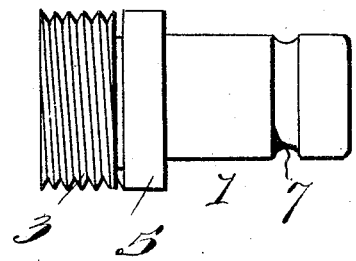
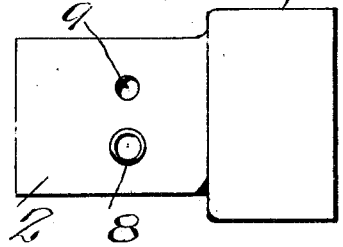
Inventor
by FLOYD E. COMER
C. C. Clements
Attorney Patented Dec. 30, 1930

1,786,825

UNITED STATES PATENT OFFICE

FLOYD E. COMER, OF BRISTOL, INDIANA

PIPE COUPLING

Application filed February 10, 1927. Serial No. 167,232.

My invention relates to pipe couplings for use with various forms of flexible or yielding pipes, and is particularly designed as a telescopic coupling device for use with hose. The telescopic coupling members are fashioned with cooperating means that coact with locking means located within an external, rotary, collar carried by the coupling device, and this collar is retained on the device by the locking members. By the utilization of the locking device of my invention, I provide a quick acting device in which the coupling members may be positively locked with facility, and with equal readiness they may be unlocked when necessary. The pipe coupling as constructed herein insures a nonleaking joint, and eliminates complicated mechanisms that are usually employed for this purpose. In carrying out my invention, I utilize a rotary locking collar with one or more pivoted pawls or detents therein and these pawls or detents coact with the telescoping coupling members as will hereinafter be more fully described and claimed.

In the accompanying drawing, I have illustrated one complete example of the physical embodiment of my invention wherein the parts are combined and arranged according to the best mode I have so far devised for the practical application of the principles of my invention.

Figure 1 is a view in side elevation showing the members coupled together and locked;

Fig. 2 is an end elevation of the coupling device;

Fig. 3 is a transverse vertical sectional view at line 3—3 of Fig. 1;

Fig. 4 is a longitudinal sectional view at line 4—4 of Fig. 3; and

Figs. 5 and 6 are views showing the nipple and socket members of the coupling device.

The telescoping members of the coupling device are indicated as a nipple 1 and a socket end 2, the former being slipped within the latter when the coupling is made as shown. The nipple 1 has exterior threads at 3 for connection to a pipe or hose end, and the socket member 2 has a bell 4 with interior threads for connection with a threaded hose coupling in suitable manner. The complementary telescoping members of the coupling are provided with shoulders 5 and 6, the former being an exterior annular shoulder on the member 1 and the latter being an interior annular flange or shoulder on the socket member 2. These shoulders limit the telescoping movement of the coupling members as will be apparent.

The nipple 1 is provided with an annular exterior groove 7 located near the inner or free end of the nipple, and the external or socket member 2 is fashioned with two holes as 8 located at diametrically opposite points, fashioned with tapering walls, and extending through the coupling member 2. The holes 8 are located in such relative position to the annular groove as to register therewith when the telescoping nipple and socket are brought together. The socket member 2 is also fashioned with a pair of exterior depressions 9 adjacent to the holes 8, and an annular gasket 10, preferably of rubber, is used between the coupling members to insure a non-leaking joint.

The nipple and socket members of the coupling are secured together through the action of a rotary locking collar or ring 11, preferably of cast iron, and encircling the telescoping coupling members. This locking collar is fashioned with side plates 12 and an open center and the side plates form an annular space within the collar in which are carried a pair of locking devices. Two pins 14 are located in the locking collar, and pass transversely through the walls thereof near the outer periphery of the collar. These pins as shown are located at diametrically opposite points, and they are designed to coact with a pair of pivoted pawls 15 fashioned as bronze castings and carried within the annular space 13 of the locking collar. Each of these pawls or pivoted detents is fashioned in curved or arcuate form and at the inner side of the pawl is located a pivot lug 16 which is adapted to seat in a depression or socket 9 of the socket member 2. A locking lug or dog 17 is also fashioned on the pawl, and each of these lugs 17 is designed to pass through a hole 8 in the socket member and fit into the annular groove 7 of the nipple member of the coupling. At the ends of each of the pivoted pawls are provided retaining lugs 18 and 19 which are adapted to contact with a pin 14 and limit the movement of the pawls.

In assembling the coupling, the pivoted pawls are placed in the locking collar, and the collar is slipped over the socket member 2, the locking pawls 17 slipping into the complementary holes 8 of the socket member. The nipple member 1 is then slipped into the socket member until the annular groove 7 registers with the holes 8, and the lugs 17 fall into the groove. The rotary locking collar is then turned, causing the pawls 15 to swing on their pivots or lugs 16, and as the collar is rotated the pins 14 ride over the exterior edge of each of the pawls, depressing the lugs 17 and locking it in its hole 8 and the annular groove 7. By this frictional engagement between the pin, the pawl, and the wall of the annular groove, the nipple, the socket member, and the locking ring are rigidly locked together. If desired to uncouple the nipple and socket members, the locking collar may be turned in a reverse direction so that the pivot of the pawl will ride past its complementary pin 14, thus swinging the pawl on its pivot and withdrawing the locking lug 17 from the annular groove. After the lugs 17 are removed or withdrawn, the nipple and socket members may be separated.

Having thus fully described my invention, what I claim as new and desire to secure by Letters Patent is:—

The combination in a telescopic hose coupling with a nipple having an exterior annular groove and a socket member having a pair of diametrically opposed holes therein, said socket member also having a pair of diametrically opposed exterior recesses, of a separate locking collar U-shaped in cross section, a pair of diametrically opposed pins supported transversely of the collar, a pair of pawls within said collar having their outer edges in frictional contact with the pins and retaining lugs at the ends of said pawls to limit their movement, lugs on said pawls having pivotal engagement in the recesses of the socket member, and a locking lug on each pawl for co-action with a hole and the annular groove.

FLOYD E. COMER.